(12) United States Patent
Zwart

(10) Patent No.: US 11,076,716 B2
(45) Date of Patent: Aug. 3, 2021

(54) FILTER ASSEMBLY FOR USE IN A FLUID CONTAINER OF A DOMESTIC APPLIANCE

(71) Applicant: KONINKLIJKE PHILIPS N.V., Eindhoven (NL)

(72) Inventor: Bart-Jan Zwart, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 295 days.

(21) Appl. No.: 15/780,650

(22) PCT Filed: Nov. 21, 2016

(86) PCT No.: PCT/EP2016/078218
§ 371 (c)(1),
(2) Date: Jun. 1, 2018

(87) PCT Pub. No.: WO2017/093053
PCT Pub. Date: Jun. 8, 2017

(65) Prior Publication Data
US 2018/0344081 A1    Dec. 6, 2018

(30) Foreign Application Priority Data
Dec. 4, 2015 (EP) .................................... 15198074

(51) Int. Cl.
*C02F 1/42* (2006.01)
*A47J 31/60* (2006.01)
*C02F 1/00* (2006.01)

(52) U.S. Cl.
CPC ............. *A47J 31/605* (2013.01); *C02F 1/003* (2013.01); *C02F 1/42* (2013.01);
(Continued)

(58) Field of Classification Search
CPC ........... A47J 31/605; C02F 1/003; C02F 1/42; C02F 2307/12; C02F 2001/425;
(Continued)

(56) References Cited

U.S. PATENT DOCUMENTS 2,358,748 A * 9/1944 Thompson ............. B01D 27/02
210/172.3
2,796,989 A * 6/1957 Gailitits et al. ........ B01D 29/15
210/282
(Continued)

FOREIGN PATENT DOCUMENTS

| CN | 102648035 A | 8/2012 |
| CN | 203244920 U | 10/2013 |

(Continued)

*Primary Examiner* — Matthew O Savage
(74) *Attorney, Agent, or Firm* — Schott, P.C.

(57) ABSTRACT

A filter assembly (10) which is suitable for use in a fluid container (1) of a domestic appliance comprises a filter element (30) and a filter housing (40) for delimiting a portion (8) of a fluid container (1) in which a fluid retrieval pipe (4) is present and in which the filter element (30) is to be arranged, the filter housing (40) being adapted to let fluid into the delimited portion (8) of the fluid container (1) and to direct a fluid flow from an inlet position (41) to an inlet (5) of the fluid retrieval pipe (4) through the filter element (30), the filter element (30) being configured for at least partially enclosing the fluid retrieval pipe (4), and the filter element (30) having a filter medium and a semi-permeable skin for at least partially enclosing the filter medium.

15 Claims, 5 Drawing Sheets

(52) U.S. Cl.
CPC .... *C02F 2201/006* (2013.01); *C02F 2303/14* (2013.01); *C02F 2303/22* (2013.01); *C02F 2303/24* (2013.01); *C02F 2307/12* (2013.01)

(58) Field of Classification Search
CPC ... C02F 2201/006; C02F 1/283; B01J 47/024; B01D 24/042; B01D 27/02
USPC ....... 210/172.3, 172.4, 416.3, 282, 459–461, 210/484
See application file for complete search history.

(56) References Cited

U.S. PATENT DOCUMENTS

| | | | | |
|---|---|---|---|---|
| 3,262,570 | A * | 7/1966 | Gailitis et al. | B01D 29/15 210/266 |
| 4,605,499 | A * | 8/1986 | Wise | C02F 1/002 210/282 |
| 5,665,224 | A | 9/1997 | Levene | |
| 6,383,375 | B1 * | 5/2002 | Zucholl | A47J 31/605 210/172.2 |
| 6,387,260 | B1 * | 5/2002 | Pimenov | B01J 47/024 210/282 |
| 6,598,421 | B1 * | 7/2003 | Suzuki | F04B 35/04 310/215 |
| 7,820,046 | B2 | 10/2010 | Saarinen | |
| 8,366,922 | B2 * | 2/2013 | McCague | B01D 24/042 210/167.13 |
| 2012/0132581 | A1 | 5/2012 | Williams | |
| 2014/0076814 | A1 * | 3/2014 | Monzingo | E04H 4/1209 210/663 |

FOREIGN PATENT DOCUMENTS

| | | |
|---|---|---|
| CN | 204469553 U | 7/2015 |
| CN | 204824502 U | 12/2015 |
| DE | 8100166 U1 | 5/1981 |
| EP | 1134012 A1 | 9/2001 |
| KR | 2013024313 A | 3/2013 |
| NL | 1019130 C2 | 4/2003 |
| WO | 2002076572 A1 | 10/2002 |
| WO | 2011107847 A1 | 9/2011 |

* cited by examiner

FILTER ASSEMBLY FOR USE IN A FLUID CONTAINER OF A DOMESTIC APPLIANCE

This application is the U.S. National Phase application under 35 U.S.C. § 371 of International Application No. PCT/EP2016/078218, filed on Nov. 21, 2016, which claims the benefit of European Patent Application No. EP15198074 filed on Dec. 4, 2015. These applications are hereby incorporated by reference herein.

FIELD OF THE INVENTION

The invention relates to a filter assembly for use in a fluid container of a domestic appliance, particularly a fluid container comprising a fluid retrieval pipe for allowing fluid retrieval from the fluid container, and furthermore relates to a filter element for use in such filter assembly, to a filter housing for use in such filter assembly, to a fluid container for use in a domestic appliance, comprising a fluid retrieval pipe for allowing fluid retrieval from the fluid container and being equipped with such filter assembly, and to a domestic appliance comprising such fluid container.

BACKGROUND OF THE INVENTION

Calcification of components is a commonly known problem in the field of various types of domestic appliances using fluid, such as beverage makers, steam irons, water purifiers etc. If no measures are taken, calcification may eventually cause failure of an appliance. Hence, methods for decalcifying appliances have been developed, which need to be performed by a user of an appliance from time to time in order to keep the components clean. However, the performance of such methods takes time and requires bothersome handling, and it may happen that a user is inclined to postpone a decalcifying process, which involves a risk of failure of the appliance as explained earlier, or it may even be so that a user forgets all about the need to perform such a decalcifying process. In order to alleviate these problems, many types of appliance are equipped with one or more water treatment filters for preventing scale formation on components. In case the appliance comprises a water container, it is advantageous if at least one of such filters is located in the water container, so as to be located upstream of all other components of the appliance and to have the possibility of treating the water before it is made to flow through the appliance during operation thereof.

In the field of coffee makers, for example, the use of a disposable filter for prevention of calcification, which is intended to be arranged in a water container of a coffee maker, is known. However, the known filters only work for a limited amount of time, are a hassle to exchange, and come at high prices. Moreover, the known filters are often not easy to find by a user of a coffee maker, and the user is required to look for a very specific type of filter which is especially made to fit in the water container of the appliance in question. Another disadvantage of the known filters resides in the fact that such filters are disposables comprising pieces of solid plastic, which, when a filter has been replaced and is cast away, involves environmental pollution.

SUMMARY OF THE INVENTION

It is an object of the invention to provide a filter assembly for use in a fluid container of a domestic appliance, which only involves low costs, and which may, on the other hand, be designed so as to have longer lifespan than known disposable filters and/or to be backwards compatible with various types of fluid containers, and may also be environmentally friendly. In view of this object, according to the invention, a filter assembly for use in a fluid container of a domestic appliance is provided, particularly a filter assembly for use in a fluid container comprising a fluid retrieval pipe for allowing fluid retrieval from the fluid container, which filter assembly comprises a filter element and a filter housing for delimiting a portion of the fluid container in which the fluid retrieval pipe is present and in which the filter element is to be arranged, the filter housing being adapted to let fluid into the delimited portion of the fluid container at an inlet position and to direct a fluid flow from the inlet position to an inlet of the fluid retrieval pipe through the filter element, the filter element having an elongated shape and being configured for mounting on the fluid retrieval pipe, particularly for at least partially enclosing the fluid retrieval pipe, and the filter element having a filter medium and a semi-permeable skin for at least partially enclosing the filter medium, which semi-permeable skin is adapted to let fluid pass while preventing particles of the filter medium from being extracted from the filter element under the influence of a fluid flow.

On the basis of the fact that the filter element comprises a filter medium and a semi-permeable skin, the invention offers an advantageous possibility of applying a relatively large amount of fluid treatment material and having a relatively large contact surface between the fluid and the fluid treatment material, besides many more advantageous possibilities as will be further explained in the following. Applying a relatively large amount of fluid treatment material adds to the lifespan of the filter element. Furthermore, within the framework of the invention, it is possible to only use the filter element as a disposable, while using the filter housing as a durable. On the basis of the use of a semi-permeable skin for covering at least a part of the filter medium of the filter element, it is possible for the filter element to be provided with only a minimum of solid plastics or other solid material(s), or to even be without any solid material at all, so that the filter element can be cheap and environmentally friendly.

For the sake of completeness, it is noted that water is a practical example of fluid to be contained by the fluid container in which the filter assembly is intended to be used. That does not alter the fact that the invention is in no way limited to one or more particular types of fluid.

It is common use for a fluid container to be equipped with a fluid retrieval pipe which serves for allowing fluid retrieval from the fluid container. Such a pipe may have a straight or a curved shape, and normally has a more or less vertical orientation, assuming a normal, operational orientation of the fluid container. Furthermore, such a pipe may be an integral part of the fluid container, or may be removable from the fluid container, whatever is practical in a given situation. In any case, when the fluid container is in place in/on the domestic appliance, and the domestic appliance is operated, fluid can be retrieved from the fluid container through the fluid retrieval pipe by exerting a pumping force for drawing fluid from the fluid container. According to the invention, the filter element is intended to be mounted on the fluid retrieval pipe of the fluid container, whereby it is achieved that the filter element is present at the very spot where fluid is made to flow and exit the fluid container, without a need of having a separate support of the filter element. In other words, an insight underlying the invention is that a fluid retrieval pipe for allowing fluid retrieval from a fluid container can have an additional function of supporting the filter element, and that a position of the filter element on the fluid retrieval pipe is a useful position directly upstream of the very exit position of the fluid, on the basis of which it can be ensured that only filtered fluid is allowed to exit the fluid container.

In view of the normal appearance of the fluid retrieval pipe of the fluid container, and also of the portion of the fluid container delimited by the filter housing, the filter element has an elongated shape and is particularly configured for at least partially enclosing the fluid retrieval pipe. For example, the filter element may be shaped like a tube, in particular a tube having a fully closed periphery or a tube having a recess in the side thereof along the length thereof. In the first case, when the filter assembly is in place in a fluid container, the filter element surrounds the fluid retrieval pipe of the fluid container, wherein the fluid retrieval pipe extends through the filter element, whereas in the latter case, the filter element partially encloses the fluid retrieval pipe.

The filter housing serves for delimiting a portion of the fluid container in which the fluid retrieval pipe is present and in which the filter element is to be arranged. In particular, the filter housing is adapted to let fluid into the delimited portion at an inlet position and to direct a fluid flow from the inlet position to an inlet of the fluid retrieval pipe through the filter element. The fluid flow directing function of the filter housing can be realized on the basis of a snug enclosure of the filter element by the filter housing, at least along the length of the fluid retrieval pipe, so that fluid being transported from the inlet position to an inlet of the fluid retrieval pipe flows through the filter element, wherein the fluid is not allowed to bypass the filter element in any way. By having the fluid flow directing function as mentioned, the filter housing has a function in guaranteeing a supply of only filtered fluid to the fluid retrieval pipe of the fluid container.

In a preferred embodiment of the filter assembly according to the invention, the filter element has a flexible structure, so that it is possible to provide only one type of filter element for use with various types of fluid containers and/or filter housings, wherein the design of the fluid retrieval pipe of one type of fluid container may deviate to some extent from the design of the fluid retrieval pipe of another type of fluid container, and wherein the design of one type of filter housing, especially as far as a space as present in the filter housing for accommodating the filter element is concerned, may deviate to some extent from the design of another type of filter housing. Furthermore, when it is possible to bend the filter element to some extent, application of the filter element is not limited to fluid retrieval pipes having a straight appearance. In particular, in such case, the filter element is also suitable to be mounted on a curved fluid retrieval pipe. Also, flexible properties of the filter element are advantageous when it comes to realizing a snug enclosure of the filter element by the filter housing as mentioned in the foregoing.

In respect of the semi-permeable skin of the filter element, it is noted that it is advantageous for this component of the filter element to be free from solid materials such as solid plastics, or to comprise only a practical minimal amount of such materials, so that when a filter element is replaced and thrown away, only minimal impact on the environment is obtained. For example, the semi-permeable skin of the filter element may be made of filter paper, preferably biodegradable paper. When the filter medium of the filter element is designed so as to only/mainly comprise biodegradable material as well, the filter element is an environmentally friendly disposable which is suitable to be used by environmentally-minded users.

As time passes during use of the filter assembly according to the invention, the filter element gets exhausted and needs to be disposed of at a certain point, but this does not apply to the filter housing. Therefore, it is highly preferred if only the filter element is a disposable, and if the filter housing is reusable and has the same lifespan as the fluid container, in which case it is important for the filter element and the filter housing to be separate components. In order to provide proper protection of the filter element and to ensure a proper fluid flow directing function, it is practical for the filter housing to have a rigid structure. For example, the filter housing may comprise solid plastics.

In a general sense, the filter medium of the filter element has a function in treating fluid, particularly in purifying the fluid. In a practical embodiment of the filter assembly according to the invention, the filter medium of the filter element is adapted to function as an ion exchanger. In particular, it is advantageous if the filter medium of the filter element is adapted to remove calcium ions from fluid flowing through the filter medium during operation. For example, the filter medium of the filter element may comprise a natural resin which is not only known for having calcium ion removal properties but also for being a biodegradable material.

Advantageously, the filter housing is at least partially translucent and/or transparent, in which case a user is allowed to visually check the condition of the filter element without a need of removing the filter housing first. Foreign contamination of the filter element can be noticed by the user right away and in case of clogging can be removed easily, in which case the filter element is suitable to be used again until the end of a normal use interval of the filter element is reached.

The filter assembly according to the invention may particularly be suitable for use in a fluid container comprising a fluid retrieval pipe having a primary inlet and a secondary inlet arranged at a mutual distance along the length of the fluid retrieval pipe. For example, assuming that the fluid retrieval pipe extends in a direction which is a generally upward direction in a normal, operational orientation of the fluid container, the primary inlet may be located at a top end of the fluid retrieval pipe, and the secondary inlet may be located at a lower level than the primary inlet. Such a type of fluid container may be used with the entire filter assembly, or with the filter housing only, depending on choices made by a user, wherein in the first case, it is intended to realize treatment of the fluid and to direct the fluid towards the primary inlet of the fluid retrieval pipe during operation, and wherein in the second case, the secondary inlet serves to allow for fluid retrieval from the fluid container with only a minimum of air captured by the housing and preceding the fluid in the process, the filter housing only serving as a siphon closure cap of the fluid retrieval pipe. In this context, in case an entire filter assembly is applied, i.e. in case both a filter element and a filter housing are applied, it is advantageous for the filter assembly to be adapted to close a secondary inlet of the fluid retrieval pipe in a mounted position on the fluid retrieval pipe, because in that way, the presence of the secondary inlet in the fluid retrieval pipe may be prevented from influencing the operation of the filter assembly. In a practical embodiment, the filter assembly may be equipped with a suitable inlet closing element.

As mentioned in the foregoing, the invention covers an option of the filter element and the filter housing being separate components. On the other hand, it is possible for the filter element and the filter housing to be provided as a unit, the filter housing and the semi-permeable skin of the filter element forming an integral entirety. For example, an appropriate part of the filter medium of the filter element may be covered by a semi-permeable skin, while the remainder of the filter medium may be covered by a non-permeable skin, wherein the latter may be a flexible foil.

In the first place, the invention relates to the filter assembly as described in the foregoing. In the second place, the invention relates to a filter element for use in a filter assembly as described in the foregoing, i.e. a filter element which is designed for mounting on a fluid retrieval pipe of a fluid container and which has a filter medium and a semi-permeable skin. In the third place, the invention relates to a filter housing for use in a filter assembly as described in the foregoing, i.e. a filter housing which is designed for delimiting a portion of a fluid container in which a fluid retrieval pipe for allowing fluid retrieval from the fluid container is present, and which is designed for accommodating the filter element. In the fourth place, the invention relates to a fluid container for use in a domestic appliance, comprising a fluid retrieval pipe for allowing fluid retrieval from the fluid container and being equipped with a filter assembly as described in the foregoing, the filter element of the filter assembly being mounted on the fluid retrieval pipe and at least partially enclosing the fluid retrieval pipe, and the filter housing of the filter assembly delimiting a portion of the fluid container in which the fluid retrieval pipe and the filter element mounted on the fluid retrieval pipe are present. Finally, in the fifth place, the invention relates to a domestic appliance comprising such a fluid container. Examples of domestic appliances in which the invention may be put to practice involve beverage makers, steam irons, water purifiers as mentioned earlier, and also kitchen appliances such as food steamers, and many other types of apparatus being equipped with a fluid container having a pipe for taking in fluid to be used in the apparatus during operation thereof from the fluid container.

The above-described and other aspects of the invention will be apparent from and elucidated with reference to the following detailed description of embodiments of a filter assembly for use in a water container of a coffee maker and a number of alternative embodiments of the filter element which is part of the filter assembly. The embodiments are just a few examples out of numerous possible embodiments existing within the framework of the invention.

BRIEF DESCRIPTION OF THE DRAWINGS

The invention will now be explained in greater detail with reference to the figures, in which equal or similar parts are indicated by the same reference signs, and in which.

DETAILED DESCRIPTION OF THE EMBODIMENTS

Figure 1:
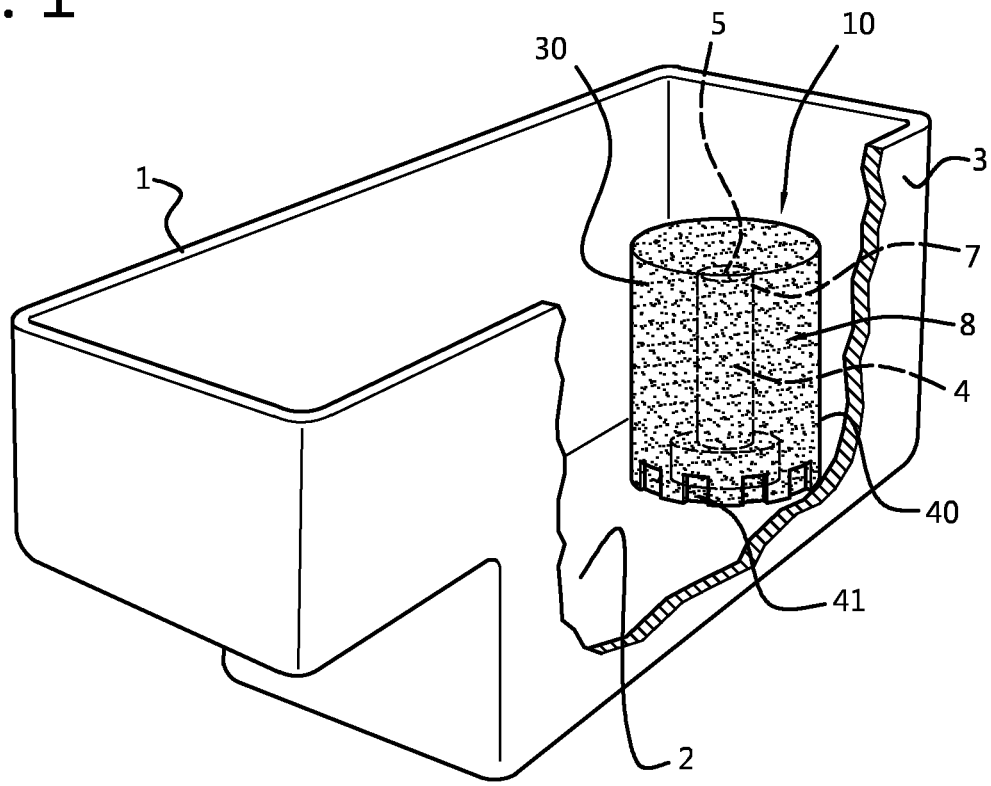
FIG. 1 diagrammatically shows a perspective view of a water tank of a coffee maker, with a portion of the water tank broken away so as to expose a filter assembly arranged in the water tank.

FIGS. 1 to 5 relate to a filter assembly 10 according to a practical embodiment of the invention. The filter assembly 10 is designed for use in a water tank 1 of a coffee maker as shown best in FIG. 1. The water tank 1 is adapted to contain a quantity of water to be used in a coffee making process, and has a bottom 2 and a standing wall 3 extending upwardly from the bottom 2, assuming a normal, operational orientation of the water tank 1 as shown in FIG. 1. The water tank 1 is equipped with a pipe 4 extending generally upward from the bottom 2 of the water tank 1. In FIG. 1, this pipe 4 is indicated by means of dashed lines. In particular, in the shown example, the standing wall 3 of the water tank 1 and the pipe 4 have a straight, generally vertical appearance. For the sake of completeness, it is noted that this shape of the water tank 1 and the pipe 4 is just one example out of numerous possibilities, and that the invention is in no way limited to any particular shape of the water tank 1 and/or the pipe 4. In FIG. 6, another possibility is illustrated, as will be explained later. Furthermore, for the sake of completeness, it is noted that the water tank 1 is representative of the more general term fluid container as used in this text.

Figure 2:
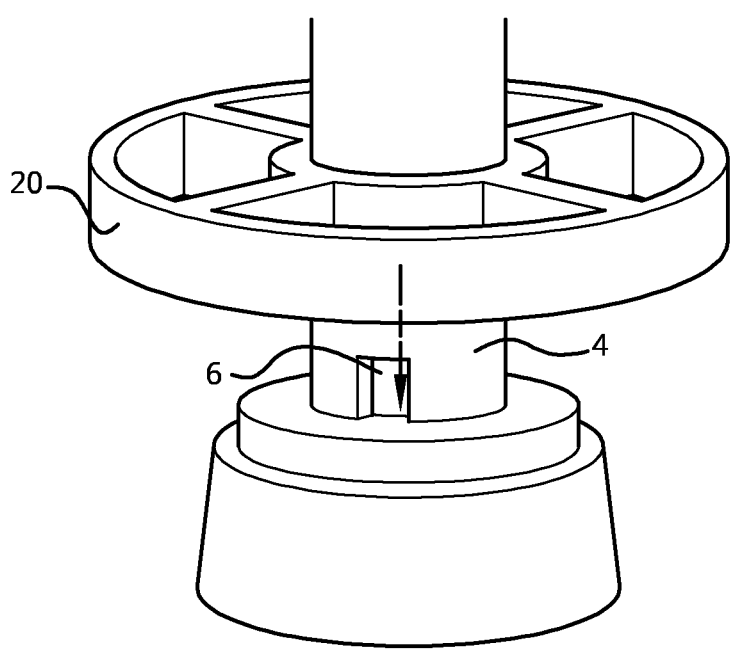
FIG. 2 diagrammatically shows a detail of a pipe as present in the water tank and an element of the filter assembly for closing a low inlet as present in the pipe.

In the shown example, the pipe 4 has two inlets 5, 6, namely one primary inlet 5 at a top end 7 of the pipe 4, which will hereinafter be referred to as high inlet 5, and a secondary inlet 6 at a relatively low level, which will hereinafter be referred to as low inlet 6. A portion of the pipe 4 in which the low inlet 6 is present is shown in FIG. 2. Furthermore, FIG. 2 shows an element 20 of the filter assembly 10 which serves for realizing a closed condition of the low inlet 6 when the filter assembly 10 is in place in the water tank 1. This element 20, which will hereinafter be referred to as inlet closing element 20, is designed to surround the pipe 4 at the level of the low inlet 6 and to close the low inlet 6 in a watertight manner. In FIG. 2, for illustration purposes, the inlet closing element 20 is shown at a position on the pipe 4 which is at a higher level than the low inlet 6, wherein an intended downward movement of the inlet closing element 20 to an operational level, i.e. a level for effectively closing the low inlet 6, is indicated by means of an arrow.

When the water tank 1 is in place in/on the coffee maker, when the filter assembly 10 is in place in the water tank 1, and when the coffee maker is operated, a suction force is exerted at the position of the high inlet 5 of the pipe 4. As is generally known, a coffee maker is usually equipped with a suitable type of pump for realizing transport of water from the water tank 1 to other components of the coffee maker, particularly a brewing chamber where the water is made to interact with a quantity of ground coffee beans in order to make a coffee drink as desired. The filter assembly 10 has a function in avoiding calcification of internal components of the coffee maker, i.e. components which are present downstream of the water tank 1, and to thereby avoid failure of the coffee maker which may otherwise occur due to the calcification phenomenon. Furthermore, the filter assembly 10 is suitable to be used to block any particles which may be present in the water from reaching the brewing chamber and from ending up in the coffee drink. This will become further apparent from the following detailed explanation of the filter assembly 10.

Figure 3:
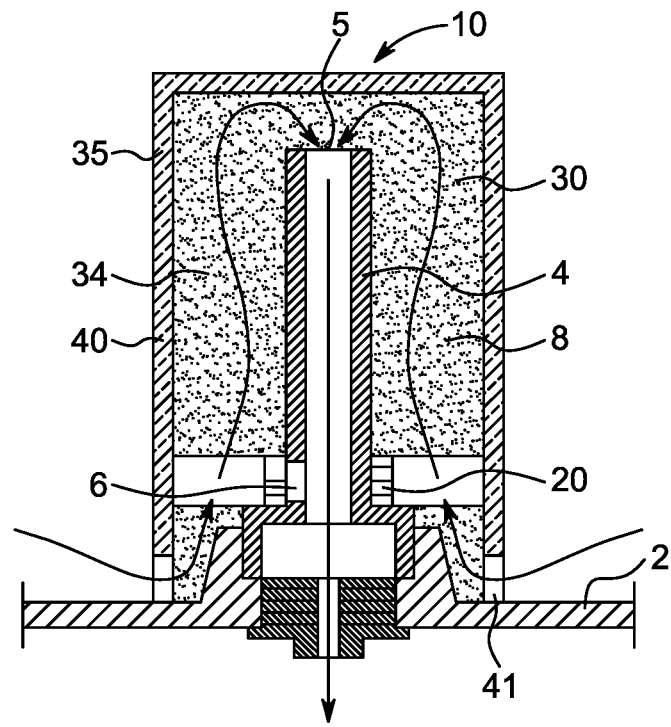
FIG. 3 illustrates how water is made to flow from outside the filter assembly to a high inlet of the pipe of the water tank, through a filter element of the filter assembly, during operation of the coffee maker.

The filter assembly 10 according to the invention comprises a filter element 30 and a filter housing 40. In the assembled condition of the filter assembly 10 as illustrated best in FIGS. 3-5, the filter element 30 is arranged inside the filter housing 40. Furthermore, in the operational position of the filter assembly 10 in the water tank 1 as illustrated in FIGS. 1 and 3, the filter element 30 is mounted on the pipe 4 of the water tank 1. The filter element 30 is shaped like a tube and has a longitudinal aperture 31 extending from a bottom end 32 of the filter element 30 along a substantial part of the entire length of the filter element 30, wherein the entire length of the tube-shaped filter element 30 is adapted to the length of the pipe 4, so that the pipe 4 extends through the filter element 30 at the position of the longitudinal aperture 31 of the filter element 30 and is surrounded by the filter element 30 from the bottom 2 of the water tank 1 to the top end 7 of the pipe 4 in the operational position of the filter assembly 10, and a top portion 33 of the filter element 30 is located above the top end 7 of the pipe 4.

In a general sense, the filter housing 40 is designed to accommodate the filter element 30. In the operational position of the filter assembly 10 in the water tank 1, as shown in FIGS. 1 and 3, the filter housing 40 delimits a portion 8 of the water tank 1 in which the pipe 4 is present. The sizes and shapes of the filter element 30 and the filter housing 40 are adapted to each other so that the filter housing 40 is capable of snugly enclosing the filter element 30 along the length of the filter element 30. As a result, there is no other way for water to be pumped from the bottom 2 of the water tank 1 to the high inlet 5 of the pipe 4 than a way through the filter element 30. At a bottom side, the filter housing 40 is provided with openings 41 for letting in water to the portion 8 of the water tank 1 delimited by the filter housing 40 under the influence of a pumping force. Thus, with the filter assembly 10 in place in the water tank 1, and the water tank 1 is in place in/on the coffee maker, water is made to travel from the bottom 2 of the water tank 1 to the high inlet 5 of the pipe 4 in the portion 8 of the water tank 1 delimited by the filter housing 40, through the filter element 30, as a result of which the water is subjected to a filtration process before reaching components of the coffee maker downstream of the water tank 1. A path followed by the water in the process is indicated in FIG. 3 by means of arrows.

Figure 4:
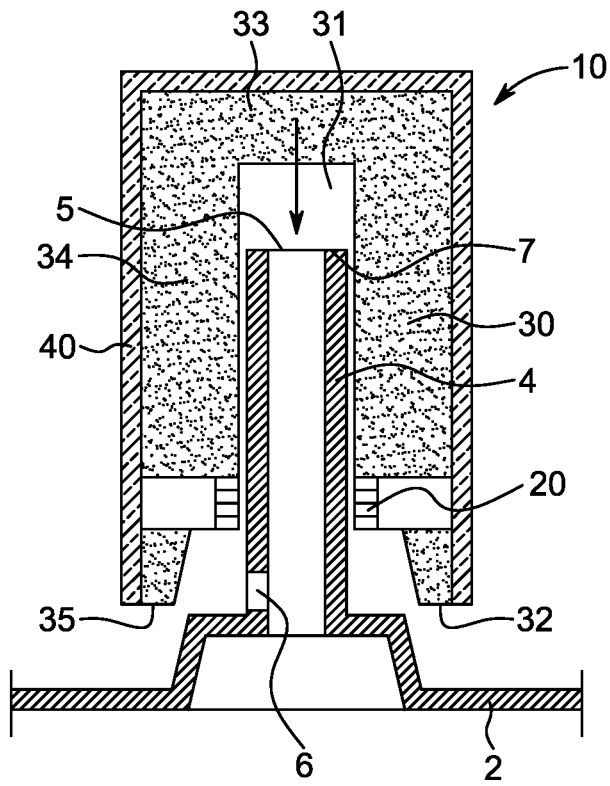
FIG. 4 illustrates how the filter assembly is put in place in the water tank.

FIG. 4 illustrates the fact that the inlet closing element 20 may be embedded in the filter element 30, and that the action of putting the filter assembly 10 in place in the water tank 1 may involve mounting the entirety of the filter element 30, the inlet closing element 20 and the filter housing 40 accommodating the filter element 30 and the inlet closing element 20 on the pipe 4 of the water tank 1, by pushing this entirety down on the pipe 4 as indicated in FIG. 4 by means of an arrow. The arrangement of the inlet closing element 20 in the filter assembly 10 is chosen such that the inlet closing element 20 is allowed to effectively close the low inlet 6 of the pipe 4 when the filter assembly 10 has been pushed all the way down on the pipe 4 and has reached its lowest, operational position.

Figure 5:
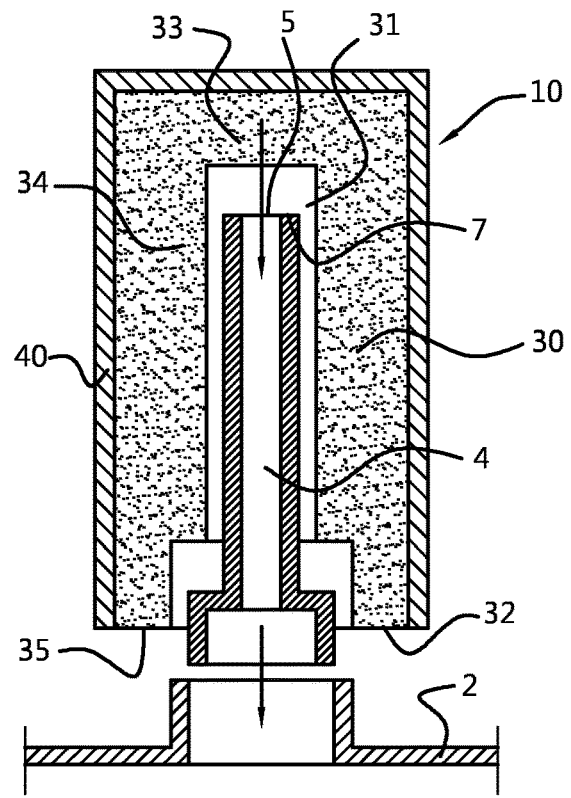
FIG. 5 illustrates an option of having a removable arrangement of the pipe in the water tank.
Figure 6:
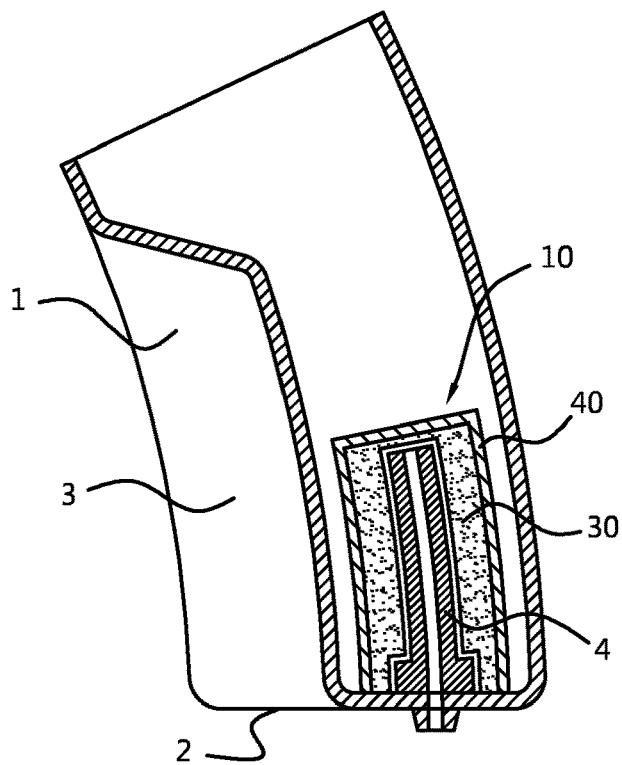
FIG. 6 diagrammatically shows a sectional view of an alternative embodiment of the water tank and a filter assembly arranged in the water tank.

FIG. 5 illustrates the fact that the pipe 4 does not necessarily need to be a fixed component of the water tank 1, but may be a removable component instead, which may be advantageous for cleaning purposes, for example. In that case, when the pipe 4 has been removed from the water tank 1, a user may perform successive actions of putting the pipe 4 in place in the water tank 1 and putting the filter assembly 10 in place in the water tank 1, mounting the filter element 30 on the pipe 4, as indicated in FIG. 5 by means of arrows.

Advantageously, both the water tank 1 and the filter housing 40 are made of a material which allows a user of the coffee maker to visually inspect the interior of the water tank 1, and particularly the portion 8 of the water tank 1 delimited by the filter housing 40. In that case, a user can immediately notice if one or more particles are present in the filter element 30 which may hinder the water supply from the water tank 1 to the other components of the coffee maker, without needing to take the action of removing the filter housing 40 for performing a visual inspection. If it is found that one or more particles are present inside the filter housing 40 which need to be removed, all that the user has to do is lift the filter assembly 10 from the pipe 4, remove the one or more particles, if necessary by taking the filter assembly 10 apart, and putting the filter assembly 10 back in place on the pipe 4 again.

It is practical for both the water tank 1 and the filter housing 40 to be made of solid plastics. On the other hand, it is preferred for the filter element 30 to be free from solid plastics, or to comprise only a minimum of solid plastics, as the filter element 30 is intended to be used as a disposable. When the filter element 30 has been used to such an extent that the filter element 30 is no longer capable of effectively removing calcium ions and possibly also other ions and/or impurities from the water, the filter element 30 should be replaced by a new one, wherein the used filter element 30 has no further function and is only suitable for being thrown away.

For the sake of completeness, it is noted that the water tank 1 may also be used with only the filter housing 40, which only serves as a siphon closure cap of the pipe 4 in that case, should a user decide at a certain point that it is alright to operate the coffee maker without the filter element 30 being present in the water tank 1. In that case, the low inlet 6 of the pipe 4 is open, and the water is supplied to the pipe 4 through the low inlet 6 instead of the high inlet 5. If the pipe 4 would only have the high inlet 5, a situation in which air enclosed in the space 8 delimited by the filter housing 40 would be sucked in through the pipe 4 and would pass the pump of the coffee maker is likely to occur, which may be harmful to the pump. Hence, having the low inlet 6 besides the high inlet 5 is advantageous as far as the lifespan of the pump of the coffee maker is concerned, which does not alter the fact that it is not essential for the pipe 4 of the water tank 1 to have more than one inlet, and which does not alter the associated fact that it is not essential for the filter assembly 10 to be adapted to close one or more secondary inlets which are only intended for use in a situation in which only the filter housing 40 is arranged in the water tank 1.

It is advantageous for the filter element 30 to be flexible, particularly to be sufficiently strong to maintain its general shape on the one hand but to be sufficiently bendable to follow various shapes of the pipe 4 during arrangement on the pipe 4 on the other hand, which allows for use of the filter element 30 with more than one type of water tank 1. FIG. 6 relates to use of the filter element 30 in a water tank 1 having a curved standing wall 3 and a curved pipe 4. In this example, the filter housing 40 is designed so as to be curved as well. Hence, when the invention is applied and the filter element 30 has flexible properties, and when only the filter element 30 is a disposable and the filter housing 40 is not, an advantageous situation is obtained in which one type of disposable can be used with various types of water tank 1 and/or various types of filter housing 40, so that the range of disposable filter elements 30 offered in the market can be kept limited, which is convenient to consumers as this facilitates the process of finding a filter element 30 which is suitable to be fit in their appliances. Another advantage of flexible properties of the filter element 30 resides in the fact that when the filter element 30 is flexible, the snug enclosure of the filter element 30 by the filter housing 40, as desired for guaranteeing an effective filtration process, is realized in a reliable and effective manner.

The filter element 30 comprises a filter medium 34 enclosed in a semi-permeable skin 35 which is suitable to be used for letting water through to the filter medium 34 while preventing particles of the filter medium 34 from being extracted from the filter element 30 by water flowing through the filter element 30 under the influence of a pumping action. In a practical embodiment, the skin 35 of the filter element 30 is made of filter paper, preferably biodegradable paper, and the filter medium 34 of the filter element 30 comprises natural resin and/or another material such as active carbon for enabling the filter medium 34 to serve as an ion exchanger for at least removing calcium ions from the water. Examples of suitable material for removing calcium ions from water are well-known in the art. The ion exchanging function and the possible materials will not be further elucidated here in view of the fact that the invention is not particularly concerned with these aspects of the filter element 30, wherein it is noted that the invention covers all possible ways in which water may be purified and the application of any possible material in the filter element 30.

Figure 7:
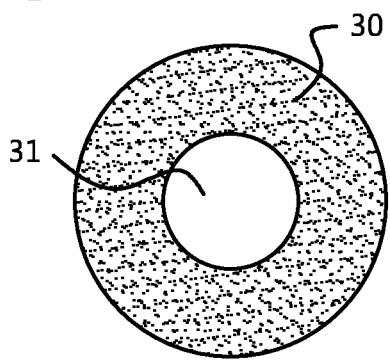
FIG. 7 diagrammatically shows a cross-sectional view of the filter element of the embodiments of the filter assembly shown in FIGS. 1-6.

FIG. 7 shows a cross-sectional view of the filter element 30 of the embodiments of the filter assembly 10 shown in FIGS. 1-6, and FIGS. 8-12 show a cross-sectional view of a number of alternative embodiments of the filter element 30. The fact is that the filter element 30 may have any suitable size and shape, taking into account the appearance of the pipe 4 on which the filter element 30 is to be mounted. In the example which is the subject of FIGS. 1-6, the filter element 30 has a circular periphery and a circular longitudinal aperture 31 which is completely surrounded by material of the filter element 30 along the length of the filter element 30, wherein the longitudinal aperture 31 is positioned so as to extend at a central position in the filter element 30. However, it is also possible to have other embodiments of the filter element 30, wherein the filter element 30 may be provided with a longitudinal aperture 31 which is completely surrounded by material of the filter element 30 or a longitudinal recess 36 which is open to the side of the filter element 30 for receiving the pipe 4. In a case in which the filter element 30 is provided with a longitudinal aperture 31 as mentioned, arranging the filter element 30 on the pipe 4 involves the action of making the filter element 30 slide down on the pipe 4 from the side of the top end 7 of the pipe 4, whereas in a case in which the filter element 30 is provided with a longitudinal recess 36 as mentioned, arranging the filter element 30 on the pipe 4 may alternatively involve an action of pressing the filter element 30 on the pipe 4 from the side, provided that the filter element 30 is sufficiently flexible for enabling such action and is arranged on the pipe 4 without being inserted in the filter housing 40 first.

Figure 8:
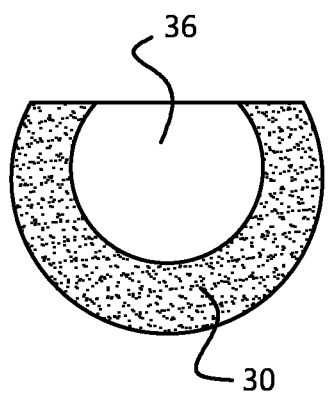
FIG. 8 diagrammatically shows a cross-sectional view of a first alternative embodiment of the filter element.
Figure 9:
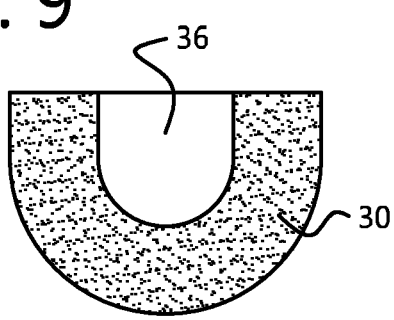
FIG. 9 diagrammatically shows a cross-sectional view of a second alternative embodiment of the filter element.
Figure 10:
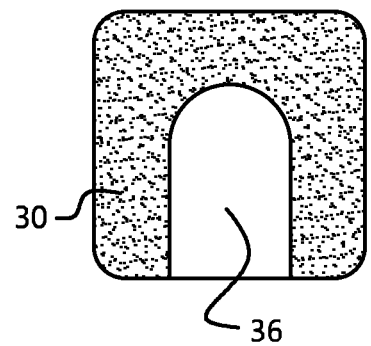
FIG. 10 diagrammatically shows a cross-sectional view of a third alternative embodiment of the filter element.
Figure 11:
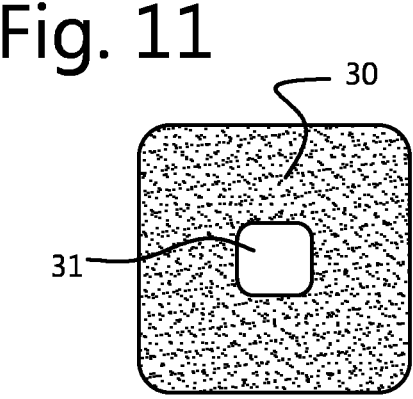
FIG. 11 diagrammatically shows a cross-sectional view of a fourth alternative embodiment of the filter element.
Figure 12:
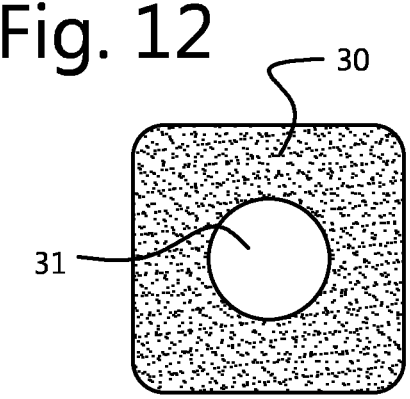
FIG. 12 diagrammatically shows a cross-sectional view of a fifth alternative embodiment of the filter element.

FIGS. 8 and 9 illustrate the fact that the filter element 30 may be open to the side, and show two possibilities of having a longitudinal recess 36 in the filter element 30. FIGS. 10-12 illustrate the fact that the periphery of the filter element 30 can have any suitable shape and does not necessarily need to be circular, but may also be square, for example. Furthermore, FIGS. 10-12 illustrate the fact that the longitudinal aperture 31 or the longitudinal recess 36 may have any suitable shape, wherein FIG. 10 shows a U shaped longitudinal recess 36, FIG. 11 shows a square longitudinal aperture 31, and FIG. 12 shows a circular longitudinal aperture 31.

Figure 13:
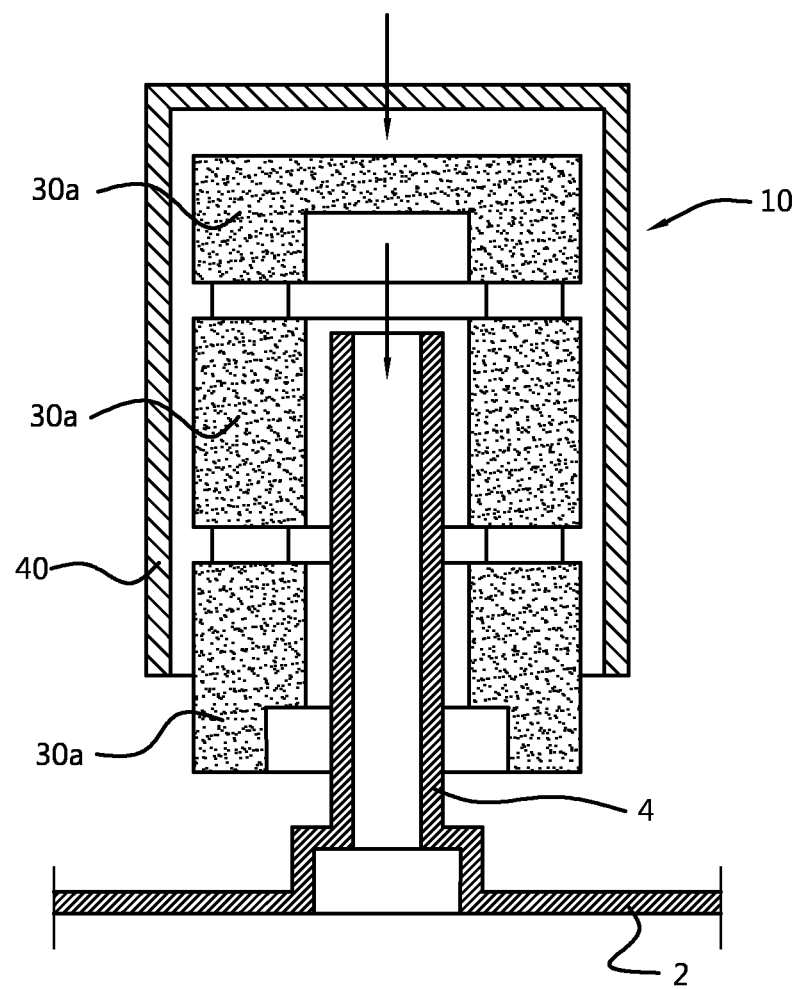
FIG. 13 diagrammatically shows a longitudinal sectional view of a sixth alternative embodiment of the filter element, and illustrates how a filter assembly comprising a filter element according to this embodiment is put in place in a water tank.

Regardless of the shape of the periphery thereof, the filter element 30 may be straight along the length thereof, or curved, whatever is appropriate in practice. In general, it is beneficial for the filter element 30 to be shaped as a thick-walled tube, comprising water treatment material in such an amount that the life span of the filter element 30 is optimal in the space requirements and other requirements of a given situation. The shape of the filter element 30 is preferably chosen so as to involve optimal filtration effectiveness and a capability to be suitable for use in various types of water tank 1. FIG. 13 illustrates an option according to which the filter element 30 is composed of various interconnected filter parts 30a. Actions of pushing the filter element 30 down on the pipe 4 of a water tank 1 and pushing a filter housing 40 down on the filter element 30, intended at realizing the operational position of a filter assembly 10 comprising the filter element 30 having the filter parts 30a, are indicated in FIG. 13 by means of arrows.

It is noted that it is not only advantageous if the filter housing 40 is adapted to snugly enclose the filter element 30, at least along a portion of a length thereof, but also if the shape and the dimensions of the filter element 30 are chosen such that the filter element 30 is capable of snugly enclosing at least a portion of a pipe 4 of a water tank 1 in which the filter assembly 10 is intended to be applied. In this way, it is not possible for water to bypass the filter element 30, so that a most effective purifying action of the filter assembly 10 may be obtained. In this respect, it is furthermore noted that the diagrammatic representations of the way in which the filter assembly 10 is mounted on a pipe 4 of a water tank 1 as can be found in FIGS. 4, 5 and 13 and the diagrammatic representation of the mounted position of the filter assembly 10 on such a pipe 4 as can be found in FIG. 6 should not be understood such as to suggest that space is present between the filter element 30 and the pipe 4 along the entire length of the pipe 4. In a similar manner, the diagrammatic representation of the filter element 30 and the filter housing 40 as can be found in FIG. 13 should not be understood such as to suggest that space is present between the filter element 30 and the filter housing 40 along the entire length of the filter element 30.

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details that are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The term "comprise" as used in this text will be understood by a person skilled in the art as covering the term "consist of". Hence, the term "comprise" may in respect of an embodiment mean "consist of", but may in another embodiment mean "contain/include at least the defined species and optionally one or more other species".

The invention claimed is:

1. A filter assembly for use in a fluid container of a domestic appliance, the fluid container comprising a fluid retrieval pipe for allowing fluid retrieval from the fluid container,
    the filter assembly comprising a filter element and a filter housing for delimiting a portion of the fluid container in which the fluid retrieval pipe is present and in which the filter element is to be arranged,
    the filter housing being adapted to let fluid into the delimited portion of the fluid container at an inlet position and to direct a fluid flow from the inlet position to an inlet of the fluid retrieval pipe through the filter element,
    the filter element having an elongated shape and being configured for mounting on the fluid retrieval pipe, wherein the filter element is further configured for at least partially enclosing the fluid retrieval pipe, the filter element being provided with a longitudinal aperture which is completely surrounded by material of the filter element such that a top portion of the filter element is configured to be located above a top end of the fluid retrieval pipe, and
    the filter element having a filter medium and a semi-permeable skin for at least partially enclosing the filter medium, which semi-permeable skin is adapted to let fluid pass while preventing particles of the filter medium from being extracted from the filter element under the influence of a fluid flow.

2. The filter assembly according to claim 1, wherein the filter element is shaped like a tube.

3. The filter assembly according to claim 1, wherein the filter element has a flexible structure.

4. The filter assembly according to claim 1, wherein the semi-permeable skin of the filter element is made of filter paper.

5. The filter assembly according to claim 1, wherein the filter housing has a rigid structure, and wherein the filter housing comprises solid plastics.

6. The filter assembly according to claim 1, wherein the filter medium of the filter element is adapted to function as an ion exchanger.

7. The filter assembly according to claim 1, wherein the filter housing is translucent or transparent.

8. The filter assembly according to claim 1, for use in a fluid container comprising a fluid retrieval pipe having a primary inlet and a secondary inlet arranged at a mutual distance along the length of the fluid retrieval pipe, the filter assembly further comprises an inlet closing element being adapted to close the secondary inlet of the fluid retrieval pipe in a mounted position on the fluid retrieval pipe.

9. The filter assembly according to claim 1, wherein the filter element and the filter housing are provided as a unit, the filter housing and the semi-permeable skin of the filter element forming an integral entirety.

10. A fluid container for use in a domestic appliance, comprising a fluid retrieval pipe for allowing fluid retrieval from the fluid container and being equipped with a filter assembly according to claim 1, the filter element of the filter assembly being mounted on the fluid retrieval pipe and at least partially enclosing the fluid retrieval pipe, and the filter housing of the filter assembly delimiting a portion of the fluid container in which the fluid retrieval pipe and the filter element mounted on the fluid retrieval pipe are present.

11. The filter assembly according to claim 1, wherein the inlet of the fluid retrieval pipe is located at the top end of the fluid retrieval pipe.

12. The filter assembly according to claim 11, wherein the fluid retrieval pipe is surrounded by the filter element from a bottom of the fluid container to the top end of the fluid retrieval pipe.

13. The filter assembly according to claim 1, wherein the fluid retrieval pipe is an integral part of the fluid container.

14. The filter assembly according to claim 1, wherein the fluid from the fluid container is retrieved through the fluid retrieval pipe by exerting a pumping force for drawing the fluid from the fluid container.

15. The filter assembly according to claim 1, wherein the longitudinal aperture extends from a bottom end of the filter element along a part of entire length of the filter element.

* * * * *